Jan. 16, 1940.　　　N. GEISER ET AL　　　2,187,704
METHOD OF PRODUCING LUBRICATING OILS
Filed Dec. 15, 1936
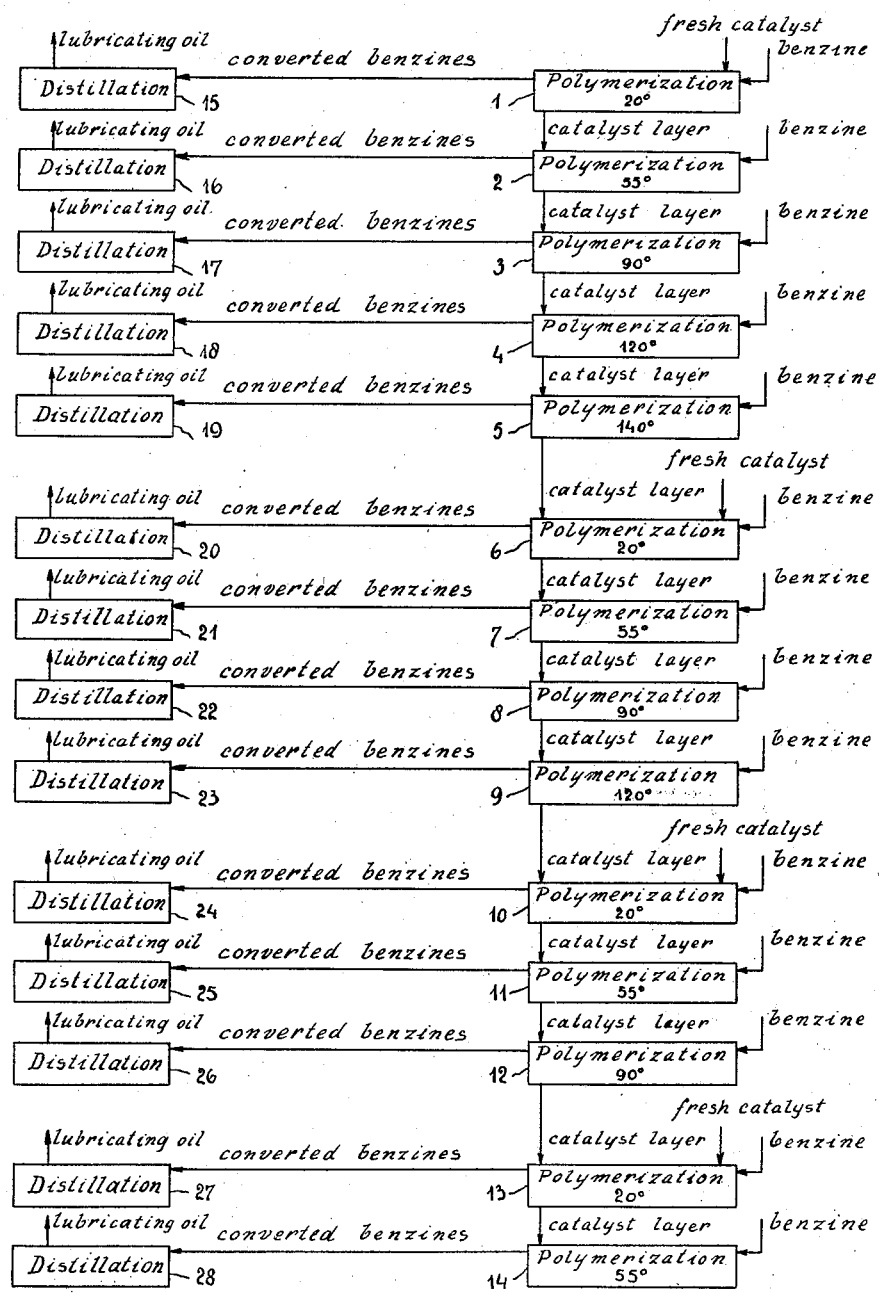
Inventors
Nikolaus Geiser
and
Herbert Goethel
by [signature]
Attys Patented Jan. 16, 1940

2,187,704

UNITED STATES PATENT OFFICE 2,187,704

METHOD OF PRODUCING LUBRICATING OILS

Nikolaus Geiser, Oberhausen-Holten, and Herbert Goethel, Hamborn, Germany, assignors to Ruhrchemie Aktiengesellschaft, Oberhausen-Holten, Germany Application December 15, 1936, Serial No. 115,950
In Germany December 20, 1935

4 Claims. (Cl. 196—78)

Our invention relates to lubricating oils, and more particularly to an improved method of producing same.

It is an object of our invention to produce lubricating oils having a low solidifying point.

It is another object of our invention to produce lubricating oils the viscosity of which varies only slightly with the temperature.

It is a further object of our invention to improve the general economy of the artificial production of lubricating oils.

It is a particular object of our invention to provide, in the production of lubricating oils, for a repeated use of a catalyst and more especially aluminium chloride in the conversion of successive charges of the starting products.

In the copending application for U. S. Letters Patent Serial No. 96,594 for a method for producing lubricating oils, filed August 18, 1936, by Herbert Goethel and Heinrich Tramm, a method of producing lubricating oils has been disclosed according to which are used as starting materials mixtures of liquid hydrocarbons, mainly of the aliphatic type obtained by the catalytic conversion of mixtures of carbon monoxide and hydrogen under ordinary pressure and at moderate temperatures. The hydrocarbon mixture thus obtained which mainly consists of liquid paraffin hydrocarbons and liquid olefines, is exposed to a cracking process, the cracking conditions being so chosen, that a hydrocarbon mixture richer in unsaturated hydrocarbons results. The cracked products obtained in this process or their fractions boiling above 150° C. which contain a higher content of unsaturated hydrocarbons, but no, or only small quantities of, aromatic hydrocarbons, are subsequently treated either totally or partly, with anhydrous aluminum chloride or some other polymerizing agent, so that by way of a condensation or polymerization viscous oils are obtained. The polymerizing catalyst may be used repeatedly for similar polymerization reactions, if in the subsequent polymerization reactions the polymerization temperature is always correspondingly increased. By this repeated reuse of the polymerizing agent for fresh polymerization reactions the consumption of polymerizing agents is remarkably decreased.

We have however found that the efficacy of the polymerizing agent or catalyst which has been used repeatedly, is finally reduced to such an extent that it must be replaced by a fresh quantity of catalyst, since by further increasing the polymerizing temperature the course of the reaction would be deranged and the catalytic mass would be damaged. We have found that at this stage of the process the catalyst can be revived in a very simple manner so as to again become capable of serving in further polymerizing reactions. The terms "polymerization" and "condensation" used in the present specification are not intended to exclude each other. Besides a polymerization of similar hydrocarbon molecules to larger ones, also condensation of different hydrocarbon molecules will take place as a rule.

The drawing accompanying this specification is a flow sheet illustrating an embodiment of our invention.

We may employ the same starting materials as mentioned above or some other hydrocarbon mixtures rich in olefines which mixtures can as a rule be obtained mainly by the following five methods:

1. By cracking the liquid paraffins and solid paraffins dissolved in these liquid hydrocarbons, which are all obtained in the synthetic production of benzine from carbon monoxide and hydrogen;

2. By catalytic dehydrogenation of any hydrocarbon oils free from aromatic compounds, for instance of mineral oils;

3. By fractionally distilling petroleum, in order to obtain fractions rich in olefines, and, if desired, combining several such fractions;

4. By a thermic polymerization of gaseous olefines;

5. By a suitably guided hydrogenation of carbon monoxide.

We will first explain more in detail these five methods of obtaining our starting materials.

The first method consists in principle of two parts, the synthetic production of benzine from carbon monoxide and hydrogen and the cracking of the hydrocarbons thus obtained. The hydrogenation of the carbon monoxide may be carried through for instance with the aid of a cobalt-thorium-kieselguhr catalyst and in the manner described in the copending application for U. S. Letters Patent Serial Number 114,186 filed by Walter Feisst, Hans Neweling and Otto Roelen for "Conversion of carbon oxides into higher hydrocarbons". This catalyst may for instance be prepared by precipitating a solution containing a cobalt salt and a thorium salt with an aqueous sodium carbonate solution, the precipitate settling on kieselguhr contained in the salt solution; the catalyst, when separated from the solution by filtration and dried, is reduced first with hydrogen at 300 to 350° C., and then contains 37.3% cobalt, 6.7% thorium oxide and 56.0% kieselguhr. Through a furnace charged with this catalyst a gas mixture consisting of 28 to 29% carbon monoxide, 56 to 60% hydrogen, the remainder being carbon dioxide and nitrogen, may be passed, at the rate of 4 litres hourly per 10 grams catalyst, at a temperature of about 185–190° C. Every 24 hours a quantity of hydrogen equal to the quantity of gas under treatment is passed during one hour at 180–185° C. through the furnace and the high molecular paraffin hydrocarbons formed during the synthetic process and settled on the catalyst are hereby removed partly under the form of solid paraffin or of high boiling oils or in part as methane or other hydrocarbon gases. Directly after the treatment with hydrogen has come to an end, the gas mixture under treatment is passed again in contact with the catalyst, which will at once form 100–110 grams liquid products per cubic-meter of the gas mixture. The catalyst may also be treated with steam before being treated with hydrogen.

Instead of the cobalt-thorium-kieselguhr catalyst an alkalinized iron catalyst may be used which can be obtained by heating ferric nitrate to convert it into ferric oxide which is then treated with 1 to 2% potassium carbonate, whereupon the mixture is reduced with hydrogen; this contact consists of about 98% metallic iron and about 2% potassium carbonate. With this catalyst the mixture of carbon monoxide and hydrogen mentioned above may be used, the operating temperature being about 250° C. At intervals of four days the temperature of the catalyst is lowered to about 110° C. and the high melting paraffin is extracted from the catalyst within the synthetical furnace with the aid of a benzine fraction boiling between 130 and 140° C. After the extraction has come to an end, hydrogen is passed through the catalyst, the temperature being at the same time raised to about 250° C. Shortly after this temperature has been reached, the starting gas mixture is again passed in contact with the catalyst and the synethetical process continued during about four days, before another regeneration operation is resorted to. The extracted solution may be subjected to distillation to separate the solvent from the high melting paraffin.

Instead of the cobalt or iron catalysts mentioned above a nickel contact may also be used. The preparation of such nickel catalyst and the hydrogenation of the carbon monoxide with its aid may be carried through in the following manner: purified kieselguhr is suspended in water and a mixture of nickel nitrate and thorium nitrate, containing 12% metallic thorium, calculated on nickel, is added. The mixture is precipitated with soda solution and the pricipitate is filtered with suction, washed and dried. The catalyst thus obtained is first reduced in a current of hydrogen at 350° C., whereafter a mixture of carbon monoxide and hydrogen in the proportion of 1:2 is passed over it at a temperature of about 180° C. During the first hours only methane will be formed, thereafter the contraction diminishes and higher homologs occur. After 24 hours colorless oils separate out and benzine may be observed in the gases. If 5 grams of the metals are used in the contact mass which is spread by means of the kieselguhr carrier over a layer 30 cms. in length and if four liters of gases are passed thereover per hour, a contraction of about 40% will be observed, while after 24 hours about 120 ccms. of liquid hydrocarbons per cubic meter of the gas used will be produced very uniformly during several weeks.

Any benzine obtained according to one of the methods described above may be cracked for the production of benzine richer in olefines. The cracking treatment is carried through at temperatures ranging from about 450° to 550° C. and under a pressure ranging from about 8 up to 15 atmospheres. Temperatures of 460–510° C. have proved particularly suitable. The time during which the hydrocarbon vapors are caused to remain in the cracking zone, depends on the cracking temperature and is the shorter, the higher the cracking temperature is chosen. At a temperature of about 480° C. the time of cracking may for instance be about 3 minutes.

As starting material for the cracking treatment are preferably used the hydrocarbon oils boiling between 150 and 350° C. which are obtained by the hydrogenation of carbon monoxide. Every 24 hours 55,000 kgs. of this product are introduced into the cracking apparatus. The hydrocarbon oils are split for instance at a temperature of 480° C. and under a pressure of about 10 atmospheres, the time of reaction being about 3 minutes. The gases and vapors leaving the cracking apparatus are led to a fractionating column, from which the gases as well as the vapors of the split benzines escape while the non-split parts of the hydrocarbons are recycled into the cracking device. The proportion of the freshly introduced hydrocarbon oils to the recycled, non-split parts of the hydrocarbons is 1:4, so that every 24 hours in all 275,000 kgs. hydrocarbon oils, viz. 55,000 kgs. fresh oils and 4 times 55,000 kgs. recycled products are introduced into the cracking apparatus. The gases and vapors escaping from the fractionating column are subsequently condensed to yield 75–77% split benzines, which are used in the polymerization or condensation treatment according to our invention, and 23–25% gases.

To the polymerization or condensation treatment may also be exposed liquid hydrocarbons obtained according to the second method mentioned above, viz., by catalytic dehydrogenation of hydrocarbon oils such as mineral oils. The dehydrogenation may be carried through for instance in a known manner by leading the oil vapors at temperatures of about 500° C. and under ordinary pressure in contact with catalysts consisting of oxides of molybdenum, zinc and magnesium and deposited on porous refractory carriers such as porcelain.

While the third method mentioned above is obvious to the expert, we will now describe more in detail the fourth method. By thermic polymerization of gaseous olefines so-called "polymeric benzines" are obtained which, being benzines rich in olefines, may be exposed to our polymerization treatment. In order to produce such "polymeric benzines" for instance a gas containing 61% propylene may be passed at a temperature of about 460° C. and under a pressure of about 100 atmospheres through empty tubes. The gas is then led through a tube of narrower cross section which is heated to about 500° C. From there the residual gases are passed through a third tube of still narrower cross section heated to about 525° C. The olefines present are thereby converted to the extent of 95% into liquid, highly valuable benzines.

According to the fifth method mentioned above the starting materials for the production of lubricating oils are obtained by a suitably controlled hydrogenation of carbon monoxide for instance by carrying through the synthesis by means of a mixture of carbon monoxide and hydrogen which contains more than one part carbon monoxide for two parts hydrogen. We may therefore use for instance ordinary water gas which has not been enriched with hydrogen. It is well known that in the synthetical production of benzine carried through under ordinary pressure and with the aid of such gases rich in carbon oxide benzines will be obtained which are comparatively rich in olefines.

We prefer to use as starting materials benzines rich in olefines obtained by cracking liquid or solid hydrocarbons which were obtained in the hydrogenation of carbon monoxide as described above in connection with the first method. We then succeed in obtaining lubricating oils of quite particularly good properties as regards their solidifying point and their viscosity pole level, calculated according to Ubbelohde (cf. "Zur Viskosimetrie" published in 1936 by S. Hirzel, Leipzig, Germany). In this way we obtain lubricating oils of a solidifying point down to −35° C. and with a viscosity which is extremely little dependent on the temperature.

The said mixtures of hydrocarbons rich in olefines or their fractions which boil above 100–150° C., may be condensed or polymerized to form viscous oils with a very slight consumption of polymerizing agents or catalysts by using the catalyst for a sequence of several reactions, each of which will be carried through at a similar higher temperature than the preceding one.

The catalyst after having been used in a number of such reactions at increased temperatures, will become weaker in efficacy.

We have now found that at this stage the addition of a small quantity of fresh catalyst will revive the catalyst converting it into a state in which it is capable of carrying through a fresh series of polymerization reactions of the kind mentioned, which reactions are again started at comparatively low temperatures. We can obtain this effect for instance by the addition of 20% of the quantity of aluminium chloride originally used. The old exhausted catalyst acquires again its full efficiency, so that it may be used afresh in several polymerization reactions, the polymerization being again carried through at the beginning at room temperature. The catalyst will be separated from the products of the reaction and used again for further polymerizations, the polymerization temperature being increased at every stage.

We have further found that the catalyst after having been weakened, may be revived by converting the exhausted catalyst in several successive polymerization reactions with cracked products of different composition. The catalyst which would otherwise already be exhausted, then shows again a high polymerizing power, so that with the same quantity of catalyst a fresh series of polymerization reactions can be carried through, in the first of which the originally used low conversion temperature is employed, while the reaction temperature is then increased from stage to stage.

With particular advantage we may use as cracked products of different composition products of increasing contents of olefines. From the synthetic benzines used as starting material fractions of increased content of olefines may first be produced for instance by distilling or mixing; in order to convert the same into lubricating oils first a low temperature, for instance room temperature, the mixtures with the lowest content of olefines are treated with the polymerization catalyst, for instance aluminium chloride. When after several polymerization stages the efficiency of the catalyst has become weaker, the catalyst separated from the products of the last reaction is used for the conversion of the fraction with the next higher content of olefines. It is expedient to use in the fresh polymerization stage a correspondingly increased temperature. The catalyst after having been used, if desired, for several similar conversions of the said benzine fraction of higher content of olefines and having become weaker in action, is then used as polymerization agent for the conversion of another benzine fraction having a still higher content of olefines. We prefer also in this case to employ a correspondingly increased reaction temperature. Thus in contrast to the experiences hitherto made in the field of the synthetic production of lubricating oils we have found that the same quantity of catalyst may be used several times in the condensation of hydrocarbon mixtures into lubricating oils, provided that the same catalyst is subsequently caused to react at increasing reaction temperatures with hydrocarbon mixtures possessing increasing contents of unsaturated hydrocarbons.

We will not explain our new method more in detail in connection with the following examples.

*Example 1*

We used for the polymerization reactions a cracked benzine of the density 0.684 at 20° C. with a content of 53.3% of unsaturated hydrocarbons. We converted 1000 grams of this cracked benzine at room temperature (20° C.) during 21 hours with 50 grams fresh anhydrous aluminium chloride. After the conversion had come to an end, the reaction mixture separated into two layers, the upper of which, the benzine layer, contained the lubricating oil formed in the polymerization. We separated the benzine layer from the lower layer which contained the aluminium chloride and double compounds of aluminium chloride. This contact layer weighed after the first conversion 255 grams, while from the benzine layer 473 grams lubricating oil were obtained by distillation. The contact layer separated off was caused to react anew for 24 hours at 55° C. with 1000 grams of the same cracked benzine. The contact layer which separated from the reaction mixture after every following conversion, was then caused to react again with 1000 grams of the same cracked benzine for 24 hours, successively at 90° C., 120° C. and 140° C. The quantities of lubricating oil obtained in the second to fifth conversion amounted to 533 grams, 436 grams, 620 grams and 718 grams, respectively.

After the fifth conversion we added 10 grams fresh anhydrous aluminium chloride to the 436 grams of the contact layer separated off and caused this mixture to react similarly in each case, with 1000 grams of the same cracked benzine. The conversion reactions may thus be caused to start again at room temperature. The successive polymerizatiozns were carried through at 20°, 55°, 90° and 120° C., respectively. After the ninth and after the twelfth conversion we added to the contact layer separated off 10 grams fresh anhydrous aluminium chloride and carried through the tenth to twelfth conversion at 20°, 55° and 90° C., the thirteenth at 20° C. and and the fourteenth at 55° C., respectively. With a consumption of 80 grams aluminium chloride we thus obtained in all 6.66 kgs. lubricating oil.

The figures of this test are summarized in Table 1.

*Table 1*

| Conversion No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Quantity of catalyst before the conversion grams | 50 AlCl₃ | 255 | 347 | 497 | 493 | 437+10 gs. AlCl₃ | 941 | 767 | 870 | 822+10 gs. AlCl₃ | 924 | 895 | 888+10 gs. AlCl₃ | 1041 |
| Contact layer after conversion grams | 255 | 347 | 497 | 493 | 437 | 941 | 767 | 870 | 822 | 924 | 895 | 888 | 1041 | 1108 |
| Temperature °C | 20 | 55 | 90 | 120 | 140 | 20 | 55 | 90 | 120 | 20 | 55 | 90 | 20 | 55 |
| Time of reaction hours | 21 | 22 | 21 | 23 | 24 | 24 | 24 | 24 | 20 | 22 | 24 | 24 | 24 | 24 |
| Quantity of benzine used grams | 1000 | 1000 | 1000 | 1000 | 1000 | 1000 | 1000 | 1000 | 1000 | 1000 | 1000 | 1000 | 1000 | 1000 |
| Lubricating oil obtained grams | 473 | 533 | 436 | 620 | 718 | 292 | 587 | 475 | 475 | 453 | 540 | 325 | 412 | 373 |

The mode of operation described in this example is illustrated in the diagram. Reference numerals 1-14 represent the vessels in which the fourteen subsequent polymerization operations are carried through, while numerals 15-28 represent the tanks to which the converted benzines, from which the lubricating oil is obtained by distillation, are conveyed from the respective polymerization vessels. The bulk of the catalyst is arranged in the polymerization vessel No. 1, while small quantities of fresh catalyst material are arranged in vessels Nos. 6, 10 and 13. The catalyst layer remaining in each polymerization vessel after withdrawal of the converted benzines is introduced into the next following polymerization vessel. The temperatures maintained in the subsequent polymerization vessels Nos. 1-14 are 20°, 55°, 90°, 120°, 140°, 20°, 55°, 90°, 120°, 20°, 55°, 90°, 20° and 55° C., respectively.

*Example 2*

We polymerized a cracked benzine fraction of a density of 0.708 at 20° C. and a content of olefines of 33.4% with a contact mass amounting to 5% fresh anhydrous aluminium chloride in five successive conversions at increasing temperatures of 20°, 55°, 90°, 120° and 140° C. in the manner described with reference to Example 1. From the third conversion on the efficacy of the catalyst diminished, so that the 405 grams of contact layer separated off after the fifth conversion were caused to react with a cracked benzine of a different composition in three further conversions. The cracked benzine used in these condensation reactions showed a density at 20° C. of 0.692 and a content of olefines of 45%. Each 1000 grams of this second cracked benzine were caused to react at temperatures of 20°, 55° and 90° C. for 22, 23 and 25 hours, respectively, with a contact layer separated off from the products of the preceding conversion reaction. In all 3787 grams lubricating oil were obtained with a consumption of 50 grams aluminium chloride. The data of this test are summarized in Table 2, which shows that the efficiency of the contact layer was by no means exhausted even after the eighth conversion.

*Example 3*

From a benzine produced from carbon monoxide and hydrogen at atmospheric pressure five fractions were prepared by fractionate distillation which decreased in density and increased in their contents of olefines in the following manner:

|  | Boiling limits | Contents of olefines | Density at 20° C. |
|---|---|---|---|
|  | °C. | Percent |  |
| Fraction No. 1 | 140–200 | 17.0 | 0.7233 |
| Fraction No. 2 | 35–200 | 22.7 | 0.6975 |
| Fraction No. 3 | 35–170 | 28.6 | 0.6717 |
| Fraction No. 4 | 25–120 | 30.0 | 0.6670 |
| Fraction No. 5 | 35–90 | 33.2 | 0.6525 |

With these five benzines two polymerization tests have been carried through for comparison, which demonstrate the advantages reached by our method.

*Test A*

In Test A 50 grams anhydrous aluminium chloride were converted in a stirring vessel for 24 hours at room temperature with 1000 grams of the benzine fraction No. 1. The reaction mixture separated into two layers. The upper layer (benzine layer) weighing 938 grams was separated from the lower layer, (contact layer) consisting of aluminium chloride and double compounds of aluminium chloride. After the first conversion the contact layer weighed 112 grams. This catalyst layer was brought to conversion at 55° C. for 24 hours with 1000 grams of the benzine fraction No. 2, being the fraction with the next higher content of olefines. After the conversion had come to an end, the benzine layer weighed 918 grams, the contact layer 186 grams. The latter was converted at 90° C. with 1000 grams of the benzine fraction No. 3. In a similar manner the benzine fractions No. 4 and No. 5 were then brought to conversion at 130° and 160° C., respectively, with the contact layers remaining over from the respectively preceding conversions. Therein the contact layer increased in weight and after the fifth conversion weighed 290 grams. The quantities of lubricating oil obtained from the benzine layers increased, with the same contact layer being used over again, in a similar manner from 96 grams in the first conversion to 192 grams in the fifth conversion, so that 750

*Table 2*

| Conversion No. | 1 | 2 | 3 | 4 | 5 | 6 | 7 | 8 |
|---|---|---|---|---|---|---|---|---|
| Kind of benzine used: Cracked benzine No. | I | I | I | I | I | II | II | II |
| Quantity of catalyst before conversion grams | 50 AlCl₃ | 212 | 296 | 309 | 376 | 405 | 490 | 436 |
| Contact layer after conversion do | 212 | 296 | 309 | 376 | 405 | 490 | 436 | 455 |
| Temperature °C | 20 | 55 | 90 | 120 | 140 | 20 | 55 | 90 |
| Time of reaction hours | 21 | 23 | 24 | 22 | 22 | 22 | 23 | 25 |
| Quantity of benzine used grams | 1000 | 1000 | 1000 | 1000 | 1000 | 1000 | 1000 | 1000 |
| Lubricating oil obtained do | 488 | 542 | 548 | 528 | 502 | 160 | 517 | 522 | grams lubricating oil were obtained in all with a consumption of 50 grams aluminium chloride. Thus the proportion of lubricating oil obtained to aluminium chloride consumed was 15:1.

Table 3 shows the figures of Test A.

*Table 3*

| Conversion No | 1 | 2 | 3 | 4 | 5 |
|---|---|---|---|---|---|
| Benzine fraction used: No | 1 | 2 | 3 | 4 | 5 |
| Quantity of catalyst before the conversion____grams | 50 AlCl₃ | 112 | 186 | 232 | 280 |
| Contact layer after conversion____grams | 112 | 186 | 232 | 280 | 290 |
| Temperature____°C | 20 | 55 | 90 | 130 | 160 |
| Time of reaction____hours | 24 | 24 | 24 | 24 | 24 |
| Quantity of benzine used____grams | 1000 | 1000 | 1000 | 1000 | 1000 |
| Quantity of the benzine layer (containing the lubricating oil) after conversion__grams | 938 | 918 | 943 | 922 | 972 |
| Lubricating oil obtained____grams | 96 | 128 | 168 | 166 | 192 |

*Test B*

In this test we started again with 50 grams aluminium chloride and carried through at increasing temperatures five polymerization reactions with benzine fractions, however of irregular contents of olefine. In the first reaction 50 grams aluminium chloride were caused to react at 20° C. for 24 hours with 1000 grams of benzine fraction No. 1. After the reaction had come to an end, the reaction mixture separated into two layers. The upper (benzine) layer weighed 925 grams, the lower (contact) layer 127 grams. With this contact layer 1000 grams of benzine fraction No. 5 were caused to react for 24 hours at 55° C. After the reaction had ended, the benzine layer weighed 923 grams, the contact layer 201 grams. This contact layer was reacted during 24 hours at 90° C. with 1000 grams of benzine fraction No. 2. The quantity of the benzine fraction increased to 1135 grams, while the contact layer only weighed 76 grams. In a similar manner in a fourth and fifth reaction the contact layers obtained in every preceding reaction were caused to react each with 1000 grams of benzine fraction No. 4 and thereafter of No. 3. The quantities of lubricating oil obtained from the benzine layers which were obtained in the single conversion reactions, were very irregular and amounted to 86 grams, 143 grams, 116 grams, 47 grams and 35 grams, respectively. Thus in the five polymerization reactions in all 427 grams of lubricating oil were obtained, so that in this case the proportion of lubricating oil obtained to the aluminium chloride used was only 8.5:1. In comparison with Test A these figures demonstrate the advantage attained by using benzine fractions, the olefine content of which is always increased. The dates of Test B are summarized in Table 4.

*Table 4*

| Conversion No | 1 | 2 | 3 | 4 | 5 |
|---|---|---|---|---|---|
| Benzine fraction used: No | 1 | 5 | 2 | 4 | 3 |
| Quantity of catalyst before the conversion____grams | 50 AlCl₃ | 127 | 201 | 76 | 41 |
| Contact layer after conversion____grams | 127 | 201 | 76 | 41 | 37 |
| Temperature____°C | 20 | 55 | 90 | 120 | 160 |
| Time of reaction____hours | 24 | 24 | 24 | 24 | 24 |
| Quantity of benzine used____grams | 1000 | 1000 | 1000 | 1000 | 1000 |
| Quantity of the benzine layer (containing the lubricating oil) after conversion__grams | 925 | 923 | 1135 | 1020 | 1002 |
| Lubricating oil obtained____grams | 86 | 143 | 116 | 47 | 35 |

Various changes may be made in the details disclosed in the foregoing specification without departing from the invention or sacrificing the advantages thereof.

We claim:

1. The method of producing lubricating oils from olefines, comprising the steps of causing, by the addition of aluminium chloride as a polymerizing catalyst, a hydrocarbon mixture mainly consisting of aliphatic hydrocarbons and being rich in olefines to polymerize, separating said polymerizing catalyst from the lubricating oil produced and reusing it repeatedly in a number of successive polymerization reactions of the same kind, while raising the reaction temperature from one to the subsequent reaction, thereafter reviving the polymerizing catalyst and reusing it in another series of similar polymerization reactions, the first of which is carried through at a temperature substantially lower than that maintained in the last polymerization reaction preceding said revival, and again raising the reaction temperature from one reaction operation to the next following one without materially exceeding about 160° C.

2. The method of producing lubricating oils from olefines, comprising the steps of causing, by the addition of aluminium chloride as a polymerizing catalyst, a hydrocarbon mixture mainly consisting of aliphatic hydrocarbons and being rich in olefines to polymerize, separating said polymerizing catalyst from the lubricating oil produced and reusing it repeatedly in a number of successive polymerization reactions of the same kind, the reaction temperature being raised from one to the subsequent reaction, thereafter reviving the polymerizing catalyst by the addition of a small proportion of fresh aluminium chloride and reusing this mixture for another series of similar polymerization reactions, the first of which is carried through at a temperature substantially lower than that maintained in the last polymerization reaction preceding said revival, while raising again the temperature from one reaction to the other without materially exceeding about 160° C.

3. The method of producing lubricating oils from olefines, comprising the steps of causing, by the addition of aluminium chloride as a polymerizing catalyst, a hydrocarbon mixture mainly consisting of aliphatic hydrocarbons and being rich in olefines to polymerize, separating said polymerizizng catalyst from the lubricating oil produced and reusing it repeatedly in a number of successive polymerization reactions of the same kind, operating at a higher reaction temperature in each subsequent reaction, thereafter reviving the polymerizing catalyst by reusing it for another series of similar polymerization reactions of a hydrocarbon mixture which contains a higher percentage of olefines than the mixture reacted upon prior to said revival, the first of these reactions being carried through at a temperature substantially lower than that maintained in the last polymerization reaction before said revival, while higher reaction temperatures are maintained in each subsequent operation without materially exceeding about 160° C.

4. The method of producing lubricating oils from olefines, comprising the steps of causing, by the addition of aluminium chloride as a polymerizing catalyst, a hydrocarbon mixture mainly consisting of aliphatic hydrocarbons and being rich in olefines to polymerize, separating said polymerizing catalyst from the lubricating oil produced and reusing it repeatedly in a number of successive polymerization reactions of the same kind, a higher reaction temperature being maintained and a hydrocarbon mixture having a higher content of olefines being reacted upon in each subsequent reaction without materially exceeding about 160° C.

NIKOLAUS GEISER.
HERBERT GOETHEL.